(12) United States Patent
Kishimoto et al.

(10) Patent No.: US 7,566,499 B2
(45) Date of Patent: Jul. 28, 2009

(54) LIGHT INTERFERENCE MULTI-LAYERED FILM-COATED POWDER DESIGN METHOD, MANUFACTURING METHOD, AND LIGHT INTERFERENCE MULTI-LAYERED FILM-COATED POWDER

(75) Inventors: Akira Kishimoto, Nishitama-gun (JP); Takafumi Atarashi, Nishitama-gun (JP); Katsuto Nakatsuka, 3-5-1403, Moniwadai 4-chome, Taihaku-ku, Sendai-shi, Miyagi 982-0252 (JP)

(73) Assignees: Nittetsu Mining Co., Ltd., Tokyo (JP); Katsuto Nakatsuka, Miyagi (JP)

(*) Notice: Subject to any disclaimer, the term of this patent is extended or adjusted under 35 U.S.C. 154(b) by 362 days.

(21) Appl. No.: 10/529,890

(22) PCT Filed: Oct. 1, 2002

(86) PCT No.: PCT/JP02/10210

§ 371 (c)(1), (2), (4) Date: Apr. 1, 2005

(87) PCT Pub. No.: WO2004/031305

PCT Pub. Date: Apr. 15, 2004

(65) Prior Publication Data

US 2005/0287030 A1    Dec. 29, 2005

(51) Int. Cl.
*B32B 5/66* (2006.01)
(52) U.S. Cl. ........... 428/403; 428/404; 428/405; 428/406; 428/407; 427/162; 427/212; 427/213.31; 427/215; 427/383.1; 427/384
(58) Field of Classification Search ......... 428/403–407; 427/162, 212, 213.31, 215, 383.1, 384
See application file for complete search history.

(56) References Cited

FOREIGN PATENT DOCUMENTS

| | | |
|---|---|---|
| EP | 0 959 107 A1 | 11/1999 |
| EP | 1066818 A1 | 1/2001 |
| EP | 1066818 A1 * | 1/2001 |
| EP | 1 138 743 A1 | 10/2001 |
| JP | 10-330644 A | 12/1998 |
| JP | 11-12488 A | 1/1999 |
| JP | 11-12489 A | 1/1999 |
| JP | 11-12490 A | 1/1999 |
| JP | 11-21467 A | 1/1999 |
| JP | 11-35843 A | 2/1999 |
| JP | 2001-271006 A | 10/2001 |
| JP | 2002-38052 | 2/2002 |
| JP | 2002-53957 A | 2/2002 |
| JP | 2002-179947 A | 6/2002 |

OTHER PUBLICATIONS

International Search Report dated Jan. 14, 2003.
Supplementary Partial European Search Report dated May 8, 2006.

* cited by examiner

*Primary Examiner*—Leszek Kiliman
(74) *Attorney, Agent, or Firm*—Sughrue Mion, PLLC (57) ABSTRACT

Optically coherent multilayered film-coated powder having weather resistance and a clear intended color, and processes for designing and producing the same are provided. A substance of the base particles providing an intended function and an intended color are selected; a spectral intensity curve and values in CIELAB color system of the intended color are measured; and with substances capable of being used as the coated layers and refractive indexes thereof being included in factors, substances and thicknesses of the coated layers and an order of formation of the layers are obtained that provide optically coherent multilayered film-coated powder having such values in CIELAB color system that minimizes a color difference and makes a hue ratio proximate to 1, by solving numerical solutions of the recurring formula for film multiple coherence.

8 Claims, 1 Drawing Sheet

FIG. 1

LIGHT INTERFERENCE MULTI-LAYERED FILM-COATED POWDER DESIGN METHOD, MANUFACTURING METHOD, AND LIGHT INTERFERENCE MULTI-LAYERED FILM-COATED POWDER

FIELD OF THE INVENTION

The present invention relates to a process for designing optically coherent multilayered film-coated powder, a process for producing the same, and optically coherent multilayered film-coated powder, and specifically, it relates to a process for designing optically coherent multilayered film-coated powder having weather resistance and a desired brilliant color, a process for producing the same, and such optically coherent multilayered film-coated powder.

BACKGROUND ART

It has been known that a surface of powder is coated with another substance to improve the properties of the powder and to provide various properties with the powder, and there are increasing demands for obtaining powder having peculiar properties. In particular, such powder is demanded that has a complex function including properties inherent to metallic powder or metallic compound powder with other properties combined therewith. In order to produce the powder, it has been considered that plural layers of metallic oxides with uniform thickness are formed on base particles.

The inventors have found such a process that a metallic film is formed on base particles, and the powder is whitened by the reflection effect of the film (JP-A-3-271376 and JP-A-3-274278), and such a process that base particles are dispersed in a metallic alkoxide solution, and a uniform metallic oxide film having a thickness of from 0.01 to 20 µm is formed on the surface of the base particles by hydrolyzing the metallic alkoxide, so as to form powder having a metallic oxide film containing a heterogeneous metal, which is different from the metal constituting the base particles (JPP-A-6-228604).

In particular, the aforementioned powder having plural layers of metallic oxide films or metallic films can be imparted with special functions by adjusting the thicknesses of the layers, and for example, in the case where the surface of the base particles is coated with a coated film having a different refractive index with a thickness corresponding to ¼ of the wavelength of the incident light, powder totally reflecting the incident light can be obtained. The inventors have demonstrated that, upon using the powder as base particles of a magnetic material, white toner powder can be produced owing to reflection of light, and furthermore, monochrome powder can also be obtained without use of any dye or pigment by controlling the number of the layers of the optically coherent multilayered film on the surface of the powder and the refractive index and the thickness of each of the layers in such a manner that the coated layers constituting the multilayered film have coherent reflection peaks at the same particular wavelength.

The control for coating the multilayered film is effected by fitting measured values of spectral reflection curves after coating each coated layers to the designed value. The control can be precisely carried out with the plane wave solution of the Maxwell's electromagnetic equation as the designed value in case where the base material is a flat plate. In the case where light having an incident wavelength λ is incident on a multilayer accumulated film having N layers in total at an incident angle $\Phi_{N+1}$, in general, assuming that $n_j$ and $d_j$ represent the refractive index and the thickness of the j-th layer from the bottom (hereinafter, sometimes referred to as the j-th layer), respectively, and $\Phi_j$ represents the incident angle of the light to the j-th layer, the following recurring formula is obtained by expanding the Maxwell's equation with the amplitude reflection intensity from the j-th layer to the (j+1)-th layer immediately thereon being represented by $R_{j+1,j}$.

$$R_{j+1,j} = \frac{r_{j+1,j} + R_{j,j-1}\exp(-2i\delta_j)}{1 + r_{j+1,j}R_{j,j-1}\exp(-2i\delta_j)} \quad (1)$$

$$2\delta_j = \frac{4\pi}{\lambda}n_j d_j \cos\phi_j$$

In the formula, $r_{j+1,j}$ represents the Fresnel reflection coefficient at the interface between the (j+1)-th layer and the j-th layer, the p polarization (with an electric field in parallel to the incident plane) is provided by the following equation, $$r_{j+1,j}=(n_{j+1}\cos\phi_j-n_j\cos\phi_{j+1})/(n_{j+1}\cos\phi_j+n_j\cos\phi_{j+1})$$

and the s polarization (with an electric field perpendicular to the incident plane) is provided by the following equation.

$$r_{j+1,j}=(2n_{j+1}\cos\phi_{j+1})/(n_{j+1}\cos\phi_{j+1}+n_j\cos\phi_j)$$

The amplitude reflection coefficient $R_{flat}(\lambda,\theta)$ from the N-layer accumulated film can be obtained by solving the equations.

In case where the base material is powder, however, there arises a problem that even when the coated layers are formed to have such a maximum or minimum reflection wavelength measured with a spectrophotometer that is intended assuming the case where the base material is a flat plate, the multilayered film coated powder finally obtained cannot provide the intended reflection intensity at the intended wavelength.

In order to solve the problem, such a technique has been disclosed that particular compensation is made in the formula providing light reflection from a multilayered film coated flat plate, whereby the coated layers are optimally designed for the thickness thereof providing the maximum or minimum reflection intensity with light having a particular wavelength (for example, see Patent Document 1).

(Patent Document 1)
  JP-A-2001-271006

However, the technique disclosed in Patent Document 1 intends only that the reflection peak or bottom of the spectral intensity waveform is positioned in the wavelength range corresponding to the intended color, and the reflectance thereof becomes maximum or minimum. Therefore, powder having a coated structure having been designed according to the technique disclosed in Patent Document 1 has a spectral intensity waveform that is not necessarily agree with the spectral intensity waveform of the intended color. It is necessary that colormatching or toning is carried out by using other pigments or the like to obtain the intended color. However, the conventional organic pigments have a problem of deteriorated weather resistance, which provides color degradation, although brilliant colors can be provided.

Furthermore, in the case where only the reflection peak or bottom is matched, there is such a problem that it provides an unnatural metallic optically coherent color like irisation with high gloss.

Accordingly, an object of the invention is to solve the problems associated with the conventional technique and to provide such optically coherent multilayered film-coated powder that has weather resistance and a brilliant intended color, and processes for designing and producing the same.

DISCLOSURE OF THE INVENTION

As described below, the problems can be solved by such a manner that in order to obtain an intended color, a reflection waveform is obtained to provide the minimum color difference from the intended color for making close to the target of the multilayered film-coated powder, and the reflection waveform is reproduced.

The invention includes the following embodiments.

(1) A process for designing optically coherent multilayered film-coated powder, which contains base particles having thereon at least two coated layers having refractive indexes different from each other, and reflects light with a particular wavelength, the process being characterized by:

selecting a substance of the base particles providing an intended function, and an intended color;

measuring a spectral intensity curve and values $L^*_0$, $a^*_0$ and $b^*_0$ in CIELAB color system of the intended color; and with substances capable of being used as the coated layers and refractive indexes thereof being included in factors, obtaining substances and thicknesses of the coated layers and an order of formation of the layers that provide optically coherent multilayered film-coated powder having such values $L^*_1$, $a^*_1$ and $b^*_1$ that minimizes a color difference ($\Delta Z^*$) expressed by the following equation (3)

$$\Delta Z^* = |(L^*_0 - L^*_1)^2 + (a^*_0 - a^*_1)^2 + (b^*_0 - b^*_1)^2|^{1/2} \quad (3)$$

and makes a hue ratio expressed by the following equation (4)

$$(a^*_0/b^*_0)/(a^*_1/b^*_1) \quad (4)$$

proximate to 1, based on the following recurring formula (1) in case where the base particles have a flat plate form:

$$R_{j+1,j} = \frac{r_{j+1,j} + R_{j,j-1} \exp(-2i\delta_j)}{1 + r_{j+1,j} R_{j,j-1} \exp(-2i\delta_j)} \quad (1)$$

$$2\delta_j = \frac{4\pi}{\lambda} n_j d_j \cos\phi_j$$

wherein $R_{j+1,j}$: an amplitude reflection intensity between a j-th layer from the bottom and a layer immediately thereon, j: an integer of at least 1 (j−1=0 represents substance)

i: an imaginary unit, $r_{j+1,j}$: a Fresnel reflection coefficient between a j-th layer from the bottom and a layer immediately thereon, $R_{j,j-1}$: an amplitude reflection intensity between a (j−1)-th layer from the bottom and a layer immediately thereon, $2\delta_j$: a phase difference at a j-th layer from the bottom, $\lambda$: an intended wavelength of reflected light, $n_j$: a refractive index of the j-th layer from the bottom, $d_j$: a thickness of the j-th layer from the bottom, and $\phi_j$: an incident angle of light on the j-th layer from the bottom, and as an equation for compensating a shape of the base particles, based on a visible light reflection waveform obtained by applying a $R_{flat}$ value obtained by substituting the recurring formula (1) to the following equation (2):

$$R(\lambda) = \int_0^{\frac{\pi}{2}} \sin 2\theta \cdot R_{flat}(\lambda, \theta) \cdot d\theta \quad (2)$$

wherein $\theta$: an incident angle on an outermost layer.

(2) The process for designing optically coherent multilayered film-coated powder according to the above (1), characterized in that substances and thicknesses of the coated layers and an order of formation of the layers are obtained that provide optically coherent multilayered film-coated powder having such values $L^*_1$, $a^*_1$ and $b^*_1$ that make the hue expressed by the equation (4) within a range of from 0.9 to 1.1.

(3) The process for designing optically coherent multilayered film-coated powder according to the above (1), characterized in that substances and thicknesses of the coated layers and an order of formation of the layers are obtained that provide optically coherent multilayered film-coated powder having such values $L^*_1$, $a^*_1$ and $b^*_1$ that make the color difference ($\Delta Z^*$) expressed by the equation (3) within a range of 100 or less.

(4) The process for designing optically coherent multilayered film-coated powder according to the above (3), characterized in that substances and thicknesses of the coated layers and an order of formation of the layers are obtained that provide optically coherent multilayered film-coated powder having such values $L^*_1$, $a^*_1$ and $b^*_1$ that make the color difference ($\Delta Z^*$) expressed by the equation (3) within a range of 50 or less.

(5) The process for designing optically coherent multilayered film-coated powder according to the above (1), characterized in that the process is carried out by simulation using a computer.

(6) A process for producing optically coherent multilayered film-coated powder, which contains base particles having thereon at least two coated layers having refractive indexes different from each other, and reflects light with a particular wavelength, the process being characterized by:

selecting a substance of the base particles providing an intended function, and an intended color;

measuring a spectral intensity curve and values $L^*_0$, $a^*_0$ and $b^*_0$ in CIELAB color system of the intended color;

with substances capable of being used as the coated layers and refractive indexes thereof being included in factors, obtaining substances and thicknesses of the coated layers and an order of formation of the layers that provide optically coherent multilayered film-coated powder having such values $L^*_1$, $a^*_1$ and $b^*_1$ that minimizes a color difference ($\Delta Z^*$) expressed by the following equation (3):

$$\Delta Z^* = |(L^*_0 - L^*_1)^2 + (a^*_0 - a^*_1)^2 + (b^*_0 - b^*_1)^2|^{1/2} \quad (3)$$

and makes a hue ratio expressed by the following equation (4)

$$(a^*_0/b^*_0)/(a^*_1/b^*_1) \quad (4)$$

proximate to 1, based on the following recurring formula (1) in case where the base particles have a flat plate form $$R_{j+1,j} = \frac{r_{j+1,j} + R_{j,j-1} \exp(-2i\delta_j)}{1 + r_{j+1,j} R_{j,j-1} \exp(-2i\delta_j)} \quad (1)$$

$$2\delta_j = \frac{4\pi}{\lambda} n_j d_j \cos\phi_j$$

wherein $R_{j+1,j}$: an amplitude reflection intensity between a j-th layer from the bottom and a layer immediately thereon, j: an integer of at least 1 (j−1=0 represents substance)

i: an imaginary unit, $r_{j+1,j}$: a Fresnel reflection coefficient between a j-th layer from the bottom and a layer immediately thereon,
$R_{j,j-1}$: an amplitude reflection intensity between a (j−1)-th layer from the bottom and a layer immediately thereon,
$2\delta_j$: a phase difference at a j-th layer from the bottom,
$\lambda$: an intended wavelength of reflected light,
$n_j$: a refractive index of the j-th layer from the bottom,
$d_j$: a thickness of the j-th layer from the bottom, and
$\phi_j$: an incident angle of light on the j-th layer from the bottom, and as an equation for compensating a shape of the base particles, based on a visible light reflection waveform obtained by applying a $R_{flat}$ value obtained by substituting the recurring formula (1) to the following equation (2)

$$R(\lambda) = \int_0^{\frac{\pi}{2}} \sin 2\theta \cdot R_{flat}(\lambda, \theta) \cdot d\theta \tag{2}$$

wherein
$\theta$: an incident angle on an outermost layer; and providing the coated layers on the base particles thus selected, according to the substances and the thicknesses of the coated layers and the order of formation of the layers thus obtained. Upon forming the layers, it is preferred to obtain in advance the relationship of the thickness of the film obtained with respect to the raw material composition or the reaction time (accumulating time) and the specific surface area of the powder.

A process for producing optically coherent multilayered film-coated powder, in which a relationship of an amount of raw material and a specific surface area with respect to a thickness is clarified in advance, and a film having $L^*_s$, $a^*_s$ and $b^*_s$ values is formed by utilizing the relationship between the production conditions and the thickness thus obtained, whereby a color difference $\Delta Z^*$ between $L^*_0$, $a^*_0$ and $b^*_0$ values of an intended color and $L^*_s$, $a^*_s$ and $b^*_s$ of a color of multilayered film-coated powder actually obtained after forming the multilayered film and a color difference $\Delta Z^*_s$ expressed by the following equation (5) is substantially the same as each other:

$$\Delta Z^* = \{(L^*_0 - L^*_1)^2 + (a^*_0 - a^*_1)^2 + (b^*_0 - b^*_1)^2\}^{1/2} \tag{5}$$

and simultaneously, a hue ratio expressed by the following equation (6) is substantially 1.

$$(a^*_0/b_0)/(a^*_s/b_s) \tag{6}$$

(7) The process for producing optically coherent multilayered film-coated powder according to the above (6), characterized in that substances and thicknesses of the coated layers and an order of formation of the layers are obtained that provide optically coherent multilayered film-coated powder having such values $L^*_s$, $a^*_s$ and $b^*_s$ that make the hue expressed by the equation (4) within a range of from 0.9 to 1.1.

(8) The process for producing optically coherent multilayered film-coated powder according to the above (6), characterized in that substances and thicknesses of the coated layers and an order of formation of the layers are obtained that provide optically coherent multilayered film-coated powder having such values $L^*_s$, $a^*_s$ and $b^*_s$ that make the color difference ($\Delta Z^*$) expressed by the equation (3) within a range of 100 or less.

(9) The process for producing optically coherent multilayered film-coated powder according to the above (8), characterized in that substances and thicknesses of the coated layers and an order of formation of the layers are obtained that provide optically coherent multilayered film-coated powder having such values $L^*_s$, $a^*_s$ and $b^*_s$ that make the color difference ($\Delta Z^*$) expressed by the equation (3) within a range of 50 or less.

(10) The process for producing optically coherent multilayered film-coated powder according to the above (6), characterized in that substances and thicknesses of the coated layers and an order of formation of the layers are obtained by simulation using a computer.

(11) Optically coherent multilayered film-coated powder, which contains base particles having thereon at least two coated layers having refractive indexes different from each other, and reflects light with a particular wavelength, the optically coherent multilayered film-coated powder being produced by:

selecting a substance of the base particles providing an intended function, and an intended color;

measuring a spectral intensity curve and values $L^*_0$, $a^*_0$ and $b^*_0$ in CIELAB color system of the intended color;

with substances capable of being used as the coated layers and refractive indexes thereof being included in factors, obtaining substances and thicknesses of the coated layers and an order of formation of the layers that provide optically coherent multilayered film-coated powder having such values $L^*_1$, $a^*_1$ and $b^*_1$ that minimizes a color difference ($\Delta Z^*$) expressed by the following equation (3):

$$\Delta Z^* = |(L^*_0 - L^*_1)^2 + (a^*_0 - a^*_1)^2 + (b^*_0 - b^*_1)^2|^{1/2} \tag{3}$$

and makes a hue ratio expressed by the following equation (4):

$$(a^*_0/b^*_0)/(a^*_1/b^*_1) \tag{4}$$

proximate to 1, based on the following recurring formula (1) in case where the base particles have a flat plate form:

$$R_{j+1,j} = \frac{r_{j+1,j} + R_{j,j-1}\exp(-2i\delta_j)}{1 + r_{j+1,j}R_{j,j-1}\exp(-2i\delta_j)} \tag{1}$$

$$2\delta_j = \frac{4\pi}{\lambda} n_j d_j \cos\phi_j$$

wherein
$R_{j+1,j}$: an amplitude reflection intensity between a j-th layer from the bottom and a layer immediately thereon,
j: an integer of at least 1 (j−1=0 represents substance)
i: an imaginary unit,
$r_{j+1,j}$: a Fresnel reflection coefficient between a j-th layer from the bottom and a layer immediately thereon,
$R_{j,j-1}$: an amplitude reflection intensity between a (j−1)-th layer from the bottom and a layer immediately thereon,
$2\delta_j$: a phase difference at a j-th layer from the bottom,
$\lambda$: an intended wavelength of reflected light,
$n_j$: a refractive index of the j-th layer from the bottom,
$d_j$: a thickness of the j-th layer from the bottom, and
$\phi_j$: an incident angle of light on the j-th layer from the bottom, and as an equation for compensating a shape of the base particles, based on a visible light reflection waveform obtained by applying a $R_{flat}$ value obtained by substituting the recurring formula (1) to the following equation (2)

$$R(\lambda) = \int_0^{\frac{\pi}{2}} \sin 2\theta \cdot R_{flat}(\lambda, \theta) \cdot d\theta \qquad (2)$$

wherein

θ: an incident angle on an outermost layer; and providing the coated layers on the base particles thus selected, according to the substances and the thicknesses of the coated layers and the order of formation of the layers thus obtained. Upon forming the layers, it is preferred to obtain in advance the relationship of the thickness of the film obtained with respect to the raw material composition or the reaction time (accumulating time) and the specific surface area of the powder.

Optically coherent multilayered film-coated powder obtained in such a manner that a relationship of an amount of raw material and a specific surface area with respect to a thickness is clarified in advance, and a film having $L^*_s$, $a^*_s$ and $b^*_s$ values is formed by utilizing the relationship between the production conditions and the thickness thus obtained, whereby a color difference $\Delta Z^*$ between $L^*_0$, $a^*_0$ and $b^*_0$ values of an intended color and $L^*_s$, $a^*_s$ and $b^*_s$ of a color of multilayered film-coated powder actually obtained after forming the multilayered film and a color difference $\Delta Z^*_s$ expressed by the following equation (5) is substantially the same as each other:

$$\Delta Z^* = \{(L^*_0 - L^*_1)^2 + (a^*_0 - a^*_1)^2 + (b^*_0 - b^*_1)^2\}^{1/2} \qquad (5)$$

and simultaneously, a hue ratio expressed by the following equation (6) is substantially 1.

$$(a^*_0/b_0)/(a^*_s/b_s) \qquad (6)$$

(12) The optically coherent multilayered film-coated powder according to the above (11), characterized in that substances and thicknesses of the coated layers and an order of formation of the layers are obtained that provide optically coherent multilayered film-coated powder having such values $L^*_s$, $a^*_s$ and $b^*_s$ that make the hue expressed by the equation (4) within a range of from 0.9 to 1.1.

(13) The optically coherent multilayered film-coated powder according to the above (11), characterized in that substances and thicknesses of the coated layers and an order of formation of the layers are obtained that provide optically coherent multilayered film-coated powder having such values $L^*_s$, $a^*_s$ and $b^*_s$ that make the color difference ($\Delta Z^*$) expressed by the equation (3) within a range of 100 or less.

(14) The optically coherent multilayered film-coated powder according to the above (13), characterized in that substances and thicknesses of the coated layers and an order of formation of the layers are obtained that provide optically coherent multilayered film-coated powder having such values $L^*_s$, $a^*_s$ and $b^*_s$ that make the color difference ($\Delta Z^*$) expressed by the equation (3) within a range of 50 or less.

(15) The optically coherent multilayered film-coated powder according to the above (11), characterized in that substances and thicknesses of the coated layers and an order of formation of the layers are obtained by simulation using a computer.

The processes for designing and producing optically coherent multilayered film-coated powder and the optically coherent multilayered film-coated powder of the invention will be described in detail below.

Upon designing optically coherent multilayered film-coated powder according to the process of the invention, firstly, a substance of the base particles providing an intended function is selected. For example, in the case where the optically coherent multilayered film-coated powder is designed and produced for a color magnetic ink, magnetic material, such as magnetite powder and iron powder, may be selected as the base particles. Once the substance of the base particles is determined, the refractive index thereof is then necessarily determined.

Secondly, an intended color is selected. For example, in the case where the optically coherent multilayered film-coated powder is designed and produced for a color magnetic ink, a color of the magnetic ink to be designed and produced is selected. The color is preferably selected from the samples having been provided. For example, it is preferably selected from the sample sheets of standard colors for coating compositions and the like published by the paint manufacturers associations of the countries.

Thirdly, a spectral intensity curve and values $L^*_0$, $a^*_0$ and $b^*_0$ in CIELAB color system of the intended color are measured. For example, a spectral intensity curve and values $L^*_0$, $a^*_0$ and $b^*_0$ in CIELAB color system of a color sample having been provided, such as the sample sheets of standard colors for coating compositions and the like published by the paint manufacturers associations of the countries.

Fourthly, with substances capable of being used as the coated layers and refractive indexes thereof being included in factors, substances and thicknesses of the coated layers and an order of formation of the layers are obtained that provide optically coherent multilayered film-coated powder having such values $L^*_1$, $a^*_1$ and $b^*_1$ that minimizes a color difference ($\Delta Z^*$) expressed by the following equation (3):

$$\Delta Z^* = |(L^*_0 - L^*_1)^2 + (a^*_0 - a^*_1)^2 + (b^*_0 - b^*_1)^2|^{1/2} \qquad (3)$$

and makes a hue ratio expressed by the following equation (4):

$$(a^*_0/b^*_0)/(a^*_1/b^*_1) \qquad (4)$$

proximate to 1, based on the following recurring formula (1) in case where the base particles have a flat plate form:

$$R_{j+1,j} = \frac{r_{j+1,j} + R_{j,j-1}\exp(-2i\delta_j)}{1 + r_{j+1,j}R_{j,j-1}\exp(-2i\delta_j)} \qquad (1)$$

$$2\delta_j = \frac{4\pi}{\lambda} n_j d_j \cos\phi_j$$

wherein $R_{j+1,j}$: an amplitude reflection intensity between a j-th layer from the bottom and a layer immediately thereon, j: an integer of at least 1 (j−1=0 represents substance)

i: an imaginary unit, $r_{j+1,j}$: a Fresnel reflection coefficient between a j-th layer from the bottom and a layer immediately thereon, $R_{j,j-1}$: an amplitude reflection intensity between a (j−1)-th layer from the bottom and a layer immediately thereon, $2\delta_j$: a phase difference at a j-th layer from the bottom, λ: an intended wavelength of reflected light, $n_j$: a refractive index of the j-th layer from the bottom, $d_j$: a thickness of the j-th layer from the bottom, and $\phi_j$: an incident angle of light on the j-th layer from the bottom, and as an equation for compensating a shape of the base particles, based on a visible light reflection waveform obtained by applying a $R_{flat}$ value obtained by substituting the recurring formula (1) to the following equation (2)

$$R(\lambda) = \int_0^{\frac{\pi}{2}} \sin 2\theta \cdot R_{flat}(\lambda, \theta) \cdot d\theta \qquad (2)$$

wherein
θ: an incident angle on an outermost layer.

At this time, it is preferred that the hue is preferentially matched among the color difference and the hue. Firstly, rough film forming conditions for making the hue ratio proximate to 1 are elicited, and the rough film forming conditions thus elicited are then further compensated to minimize the color difference. After compensating the film forming conditions to minimize the color difference, the film forming conditions are further compensated to make the hue ratio further proximate to 1. Again, the film forming conditions are further compensated to minimize the color difference. The operations of compensating the film forming conditions are conducted until the color difference is minimized, and the hue ratio is made proximate to 1.

The compensation operations are carried out by converting the recurring formula (1) and an analytic solution obtained therefrom by using the appendix table of JIS Z8729.

In the aforementioned operations, the hue ratio may be made proximate to 1, and specifically, it is preferably within a range of from 0.9 to 1.1.

The color difference may be minimized, and specifically, it is preferably 100 or less, and more preferably 50 or less.

The aforementioned operations are preferably carried out by simulation using a computer.

Upon carrying out simulation using a computer, the refractive index of the base particles thus selected, the spectral intensity curve and values $L^*_0$, $a^*_0$ and $b^*_0$ in CIELAB color system of the intended color, and the refractive index of the substance capable of being used as the coated layers are input in a computer, and an analytic solution is obtained by using a program produced based on the recurring formula (1) and the equation (2) for compensating the shape of the base particles (for carrying out sphere approximation).

Subsequently, the respective coated layers are provided on the base particles to achieve the substances and thicknesses of the coated layers and the order of formation of the layers thus obtained, whereby the optically coherent multilayered film-coated powder is produced. Upon forming the layers, it is preferred to obtain in advance the relationship of the thickness of the film obtained with respect to the raw material composition or the reaction time (accumulating time) and the specific surface area of the powder.

In the case of film formation in a liquid phase, particularly, it is preferred to obtain in advance the relationship of the thickness of the film with respect to the amount of the raw material and the specific surface area. In the case of film formation in a gas phase, it is preferred to obtain the accumulating rate from the relationship between the fed amount of the raw material (evaporation amount) and the specific surface area.

The thickness of the film can be highly precisely controlled with respect to the intended thickness by using the relationship between the film forming conditions and the thickness, whereby the color difference $\Delta Z^*$ between the intended color and the designed color of the multilayered film-coated powder is substantially agree with $\Delta Z^*_s$ expressed by the following equations (3) and (5), assuming that $L^*$, $a^*$ and $b^*$ of the intended color are represented by $L^*_0$, $a^*_0$ and $b^*_0$, those of the designed color of the multilayered film-coated powder are represented by $L^*_1$, $a^*_1$ and $b^*_1$, and those of the color of the multilayered film-coated powder actually obtained are represented by $L^*_s$, $a^*_s$ and $b^*_s$:

$$\Delta Z^* = |(L^*_0 - L^*_1)^2 + (a^*_0 - a^*_1)^2 + (b^*_0 - b^*_1)^2|^{1/2} \qquad (3)$$

$$\Delta Z^* = \{(L^*_0 - L^*_1)^2 + (a^*_0 - a^*_1)^2 + (b^*_0 - b^*_1)^2\}^{1/2} \qquad (5)$$

and simultaneously, the ratios of color differences expressed by the following equations (4) and (6) become substantially the same value proximate to 1.

$$(a^*_0/b^*_0)/(a^*_1/b^*_1) \qquad (4)$$

$$(a^*_0/b_0)/(a^*_s/b_s) \qquad (6)$$

Accordingly, multilayered film-coated powder having such a color can be reproduced that is substantially the same as the intended color and the designed values.

The base particles used in the optically coherent multilayered film-coated powder of the invention is not particularly limited as far as the material thereof is selected in advance, and may be an inorganic material including metals, an organic material, a magnetic material, a dielectric material or an insulating material. In the case where the base material is a metal, the metal may be any metal, such as iron, nickel, chromium, titanium and aluminum, and upon utilizing magnetism thereof, a material having magnetism, such as iron, is preferred. The metals may be an alloy, and a ferromagnetic alloy is preferably used upon using a material having magnetism. In the case where the base material is a metallic compound, representative examples thereof include oxides of the aforementioned metals, and for example, it may be an oxide of iron, nickel, chromium, titanium, aluminum or silicon, and in addition, an oxide of calcium, magnesium or barium, or a complex oxide thereof.

Examples of a metallic compound other than metallic oxides include a metallic nitride, a metallic carbide, a metallic sulfide, a metallic fluoride, a metallic carbonate and a metallic phosphate.

As the base particles, a compound of a metalloid or a nonmetal, particularly an oxide, a carbide and a nitride, silica and glass beads may be used, in addition to metals. Other examples of an inorganic material include inorganic hollow particles, such as Shirasu balloons (hollow silicate particles), hollow carbon microspheres (Kreca Sphere), fused alumina bubbles, Aerosil, white carbon, hollow silica microspheres, hollow calcium carbonate microspheres, calcium carbonate, perlite, talc, bentonite, micas such as synthetic mica and commonmica and kaolin.

As the organic material, resin particles are preferred. Specific examples of the resin particles include cellulose powder, cellulose acetate powder, polyamide, an epoxy resin, polyester, a melamine resin, polyurethane, a vinyl acetate resin, a silicone resin, and spherical or crushed particles obtained by polymerization or copolymerization of an acrylate ester, a methacrylate ester, styrene, ethylene, propylene and derivatives thereof. Especially preferred examples of the resin particles include spherical acrylic resin particles obtained by polymerization of acrylic acid or a methacrylate ester. In the case where resin particles are used as the base material, the heating temperature upon drying is necessarily equal to or lower than the melting point of the resin.

Examples of the shape of the base material include a spherical body, a nearly spherical body, an isotropic body, such as a regular polyhedron, a rectangular parallelepiped, a spheroid and a polyhedron such as a rhombohedron, a plate body and an acicular body (including a cylinder and a prism), and powder having an irregular shape, such as a pulverized product, may also be used. The base material is not particularly limited in particle diameter thereof, and it is preferably in a range of from 0.01 μm to several millimeters.

The base particles having a specific gravity of from 0.1 to 10.5 may be used, and in the case where the resulting powder is used after dispersing in a liquid, the specific gravity is preferably from 0.1 to 5.5, more preferably from 0.1 to 2.8, and further preferably from 0.5 to 1.8, from the stand point off low ability and floating property. In the case where the resulting powder is used after dispersing in a liquid, a specific gravity of less than 0.1 provide too large floating force, and thus the film is necessarily multilayered or considerably thick, which is uneconomical. In the case where it exceeds 10.5, the film for floating becomes too thick, which is also uneconomical.

The coated layers are the formed on the aforementioned base particles to achieve the substances and thicknesses of the coated layers and the order of formation of the layers thus obtained. The coated layer to be formed is not particularly limited, as far as the substances of the coated layers, the number of the coated layers, and the order of formation of the layers thus obtained, and examples thereof include those formed of a metallic compound and an organic material.

Examples of the metallic compound include a metallic oxide, a metallic sulfide, a metallic selenide, a metallic telluride and a metallic fluoride. Specifically, preferred examples thereof include zinc oxide, aluminum oxide, cadmium oxide, titanium oxide, zirconium oxide, tantalum oxide, silicon oxide, antimony oxide, neodymium oxide, lanthanum oxide, bismuth oxide, cerium oxide, tin oxide, magnesium oxide, lithium oxide, lead oxide, cadmium sulfide, zinc sulfide, antimony sulfide, cadmium selenide, cadmium telluride, calcium fluoride, sodium fluoride, aluminum trisodium fluoride, lithium fluoride and magnesium fluoride.

A film forming method for the metallic compound film will be described. The film forming method may be such a method that the metallic compound is directly vapor-deposited on the surface of the base particles by the vapor phase deposition method, such as the PVD method, the CVD method and the spray drying method. However, the solid phase deposition method through hydrolysis of a metallic alkoxide (the metallic alkoxide method) disclosed in JP-A-6-228604, JP-A-7-90310 and International Application WO96/28269 as proposed by the inventors, and the solid phase deposition method through reaction of a metallic salt in an aqueous solution (the aqueous system method) disclosed in JP-A-11-131102 are preferred.

In the film forming method, the metallic alkoxide method necessitates a metallic alkoxide, which is expensive, as a raw material, and an organic solvent, which is relatively expensive and dangerous, as a reaction solvent. Therefore, the production apparatus and equipment therefor are necessarily explosion proof, which brings about further deterioration in cost per performance. According to the standpoint, the aqueous system method is preferred in comparison to the metallic alkoxide method.

The organic material is not particularly limited, and is preferably a resin. Specific examples of the resin include cellulose, cellulose acetate, polyamide, an epoxy resin, polyester, a melamine resin, polyurethane, a vinyl acetate resin, a silicone resin, and a polymer or a copolymer of an acrylate ester, a methacrylate ester, styrene, ethylene, propylene or a derivative thereof.

In the case where an organic material film (resin film) is formed, such a method is employed, as (a) a method, in which the base particles are dispersed in a liquid, and emulsion polymerization is carried out to form a resin film on the particles (the polymerization method in a liquid phase), and (b) the film forming method in a vapor phase (CVD or PVD).

BEST MODE FOR CARRYING OUT THE INVENTION

The invention will be described in more detail below with reference to the example, but the scope of the invention is not limited thereto.

EXAMPLE

1. Determination of Initial Conditions
① The base particles were determined based on the function. In order to attain magnetism, carbonyl iron powder (average particle diameter: 4 μm) was selected.
② The intended color was determined. The intended color was a clear cyan color, i.e., Muncell color 5B4/9 from the sample sheets of standard colors for coating compositions by the Japan Paint Manufacturers Associations, was targeted.
③ The spectral reflection curve and the values $L^*_0$, $a^*_0$ and $b^*_0$ in CIELAB color system of the intended color were measured.

Figure 1:
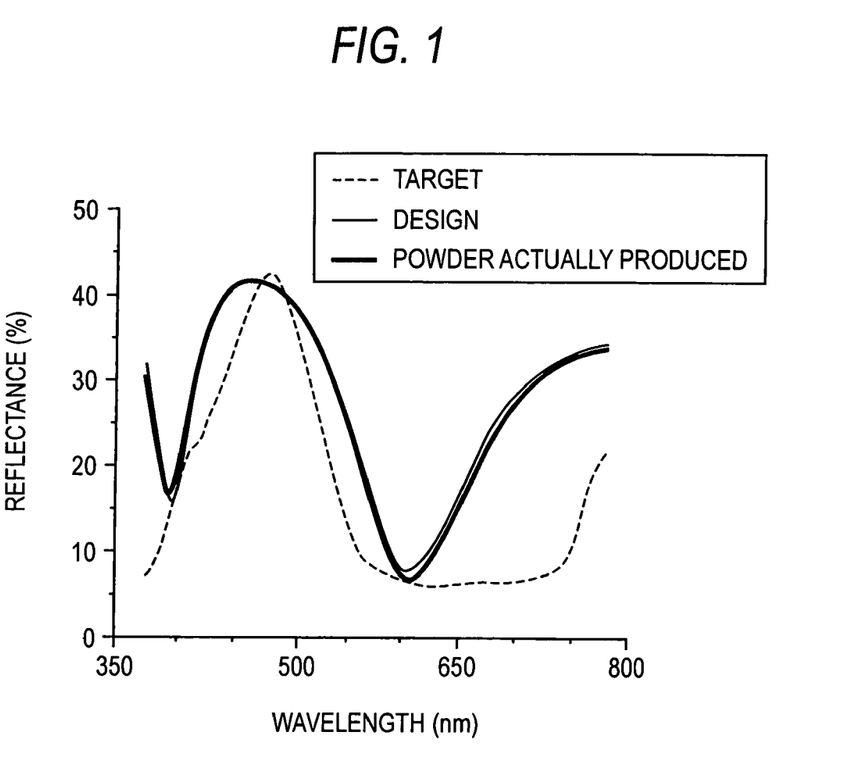
FIG. 1 is a diagram showing spectral intensity curves of the intended color sample, the designed powder and the powder actually produced in the Example.

The spectral intensity curve of the intended color was as the broken line in FIG. 1, and the values $L^*_0$, $a^*_0$ and $b^*_0$ in CIELAB color system thereof were as shown in the following table.

| $L^*_0$ | $a^*_0$ | $b^*_0$ |
|---|---|---|
| 51.39 | −19.3 | −30.59 |

④ The values $L^*_1$, $a_1$ and $b^*_1$ of the multilayered film-coated powder having the base particles having on the surface thereof a multilayered film having two or more layers that satisfy the following conditions were explored.

In the calculation of waveforms, the recurring formula (1) for film multiple coherence and the equation (2) for shape compensation were solved for the respective coated layers to determine the thicknesses of the layers. The optimum thickness is obtained as a numerical solution solved by a computer with a program having been provided. The method for optimizing the thickness of the multilayered film was the simplex method.

2. Calculation of Intended Thickness
The qualifying conditions for obtaining numerical solutions of the intended thickness and film constitution were set as follows, and the numerical solutions were obtained.
a. As for a film substance capable of being formed in to a film, an optical constant having been prepared (measured) was used.
b. One minimizing the color difference (100 or less, more preferably 50 or less) was explored.

$$\Delta Z^* = |(L^*_0 - L^*_1)^2 + (a^*_0 - a^*_1)^2 + (b^*_0 - b^*_1)^2|^{1/2}$$

$$\Delta Z^* \leq 100$$

c. The following condition for agreeing the hue was also applied, i.e., one satisfying the following equation was explored.

$$0.9 \leq (a^*_0/b^*_0)/(a^*_1/b^*_1) \leq 1.1$$

d. The number of layers was started from 2 and increased up to 60 layer until the solution was found.

(5) A theoretical spectral reflection curve of multilayered film-coated powder exhibiting a color proximate to the intended color with the optimized three layers was obtained. The theoretical spectral reflection curve is shown as the solid line in FIG. 1. The designed values $L^*_1$, $a^*_1$ and $b^*_1$ in CIELAB color system obtained by converting the spectral intensity curve by using the appendix table of JIS Z8729 were as shown in the following table.

| $L^*_1$ | $a^*_1$ | $b^*_1$ |
|---|---|---|
| 52.47 | −17.11 | −27.76 |

The color difference from the intended color (Muncell color 5B4/9 from the sample sheets of standard colors for coating compositions by the Japan Paint Manufacturers Associations) and the hue were as follows.

$$\Delta Z^* = 14$$

$$(a^*_0/b^*_0)/(a^*_1/b^*_1) = 1.02$$

The film constitutional conditions (number of layers, species of layer substance, order of layers and thicknesses of layers) obtained by the designing operation was as follows.

|  | Film substance | Thickness |
|---|---|---|
| First layer | $SiO_2$ | 96.8 nm |
| Second layer | $Al_2O_3$ | 75.1 nm |
| Third layer | $TiO_2$ | 74.7 nm |

3. Formation of Coated Layers

The aforementioned film constitutional conditions were used as a target on forming the film.

(6) The relationships between the addition amount of the raw material for the film substance and the thickness for respective layers formed on the surface of the base particles were determined.

(7) The layers having the intended thickness were formed on the surface of the particles. The formation was carried out by confirming by waveforms that the optimized layers of the film-coated powder were formed according to the designed values.

(1) Formation of Silicon Oxide First Layer (Preparation of Buffer Solution)

0.3 mole of potassium chloride and 0.3 mole of boric acid were dissolved in 1 L of water to prepare an aqueous solution 1.

0.4 mole of sodium hydroxide was dissolved in 1 L of water to prepare an aqueous solution 2.

The aqueous solution 1 and the aqueous solution 2 were mixed at a volume ratio of 250/115 to prepare a buffer solution.

(Formation of Silicon Oxide Film)

3,751 mL of the buffer solution having been prepared and 313 mL of pure water were added to 30 g of carbonyl iron powder, produced by BASF, Ltd. (average particle diameter: 4 μm), i.e., the raw material powder was put in the mixed solution under stirring and sufficiently dispersed by applying ultrasonic wave at 28 kHz and 600 W in an ultrasonic vessel.

The mixed solution having the powder dispersed therein was maintained at 30° C., to which 1,400 mL of sodium silicate aqueous solution (10 wt %) having been prepared was gradually added at 2.67 mL/min, whereby a silica film was deposited on the surface of the powder.

After completing the addition of the sodium silicate aqueous solution, the reaction was effected for further 2 hours.

After completing the film forming reaction, the slurry containing the powder having the silica film was repeatedly washed with a sufficient amount of water by decantation.

After washing, a solid component was separated from a liquid component, and the solid component was dried with a dryer at 120° C. for 8 hours in a vat.

The dried powder was subjected to a heat treatment under a nitrogen atmosphere at 500° C. for 30 minutes in a rotary tube furnace, whereby silicon oxide-coated iron powder $A_1$ was obtained.

(2) Formation of Aluminum Oxide Second Layer 4,200 mL of the same buffer solution as prepared in (1) and 353 mL of pure water were mixed, and 25 g of the powder A1 obtained in (1) was put in the mixed solution under stirring and sufficiently dispersed by applying ultrasonic wave at 28 kHz and 600 W in an ultrasonic vessel.

The mixed solution having the powder $A_1$ dispersed therein was maintained at 30° C., to which 770 mL of aluminum chloride aqueous solution (8 wt %) having been prepared was added at a feeding rate of 2.1 mL/min, whereby an alumina film was deposited on the surface of the powder $A_1$.

After completing the addition of the aluminum chloride aqueous solution, the reaction was effected for further 2 hours.

After completing the film forming reaction, the slurry containing the powder having the alumina film was repeatedly washed with a sufficient amount of water by decantation.

After washing, a solid component was separated from a liquid component, and the solid component was dried with a dryer at 120° C. for 8 hours in a vat.

The dried powder was subjected to a heat treatment under a nitrogen atmosphere at 500° C. for 30 minutes in a rotary tube furnace, whereby silicon oxide/aluminum oxide-coated iron powder $A_2$ was obtained.

(3) Formation of Titanium Oxide Third Layer (Preparation of Dropping Solution)

273 g of 28% aqueous ammonia and 133 g of a 31% hydrogen peroxide solution were mixed with 133 g of a 20% titanium(III) chloride solution to obtain a peroxytitanic acid solution (hereinafter, referred to as a dropping solution).

(Formation of Titanium Oxide Film)

20 g of the silicon oxide/aluminum oxide-coated iron powder $A_2$ was put in a mixed solution obtained by mixing 4,200 mL of the same buffer solution as prepared in (1) and 353 mL of pure water, under stirring, and sufficiently dispersed by applying ultrasonic wave at 28 kHz and 600 W in an ultrasonic vessel.

135.2 g of the dropping solution was added thereto at a feeding rate of 1.5 mL/min, whereby a titania film was deposited on the surface of the powder.

After completing the dropping, the reaction was effected for 2 hours.

After completing the film forming reaction, the slurry containing the powder having the titania film was repeatedly washed with a sufficient amount of water by decantation.

After washing, a solid component was separated from a liquid component, and the solid component was dried with a dryer at 120° C. for 8 hours in a vat.

The dried powder was subjected to a heat treatment under a nitrogen atmosphere at 500° C. for 30 minutes in a rotary tube furnace, whereby silicon oxide/aluminum oxide/titanium oxide-coated iron powder A was obtained.

4. Evaluation of Product

The powder A thus obtained was measured for a spectral reflection curve and values $L^*_s$, $a^*_s$ and $b^*_s$ in CIELAB color system.

The spectral reflection curve of the powder A thus obtained was as shown by the thick solid line in FIG. 1, and the values $L^*_s$, $a^*_s$ and $b^*_s$ in CIELAB color system were as shown in the following table.

| $L^*_s$ | $a^*_s$ | $b^*_s$ |
|---|---|---|
| 52.67 | −17.78 | −27.30 |

The color difference from the intended color (Muncell color 5B4/9 from the sample sheets of standard colors for coating compositions by the Japan Paint Manufacturers Associations) and the hue were as follows.

$\Delta Z^* = 15$ $(a^*_0/b^*_0)/(a^*_s/b^*_s) = 0.97$

The color of the powder A thus actually obtained was the same as the intended color (Muncell color 5B4/9 from the sample sheets of standard colors for coating compositions by the Japan Paint Manufacturers Associations) by visual observation. Thus, multilayered film-coated powder having an intended color can be obtained by designing and producing the powder according to the aforementioned procedures.

INDUSTRIAL APPLICABILITY

According to the process for designing optically coherent multilayered film-coated powder of the invention, such optically coherent multilayered film-coated powder can be obtained that has weather resistance and a clear intended color. The optically coherent multilayered film-coated powder thus obtained is useful in various industrial fields, for example, coating on automobiles, coating on ornamentations, pigment coloration of plastics, coating compositions, printing ink and the like.

The optically coherent multilayered film-coated powder thus obtained is also useful for producing anticounterfeit confidential documents, such as bank bills, checks, check cards, credit cards, fiscal stamps, postal stamps, train and air tickets, phonecards, lottery, gift cards, and travel and identification certificates.

The invention claimed is:

1. A process for designing optically coherent multilayered film-coated powder, which comprises base particles having thereon at least two coated layers having refractive indexes different from each other, and reflects light with a particular wavelength, the process being characterized by:
    selecting a substance of the base particles providing an intended function, and an intended color;
    measuring a spectral intensity curve and values $L^*0$, $a^*0$ and $b^*0$ in CIELAB color system of the intended color; and
    identifying substances and thicknesses of the coated layers and an order of formation of the layers that provide an optically coherent multilayered film-coated powder having values $L^*1$, $a^*1$ and $b^*1$ that minimize a color difference ($\Delta Z^*$) expressed by the following equation (3):

$$\Delta Z^* = |(L^*_0 - L^*_1)^2 + (a^*_0 - a^*_1)^2 + (b^*_0 - b^*_1)^2|^{1/2} \quad (3)$$

and make a hue ratio expressed by the following equation (4):

$$(a^*_0/b^*_0)/(a^*_1/b^*_1) \quad (4)$$

within a range of from 0.9 to 1.1,
    based on the following recurring formula (1) in case where the base particles have a flat plate form:

$$R_{j+1,j} = \frac{r_{j+1,j} + R_{j,j-1}\exp(-2i\delta_j)}{1 + r_{j+1,j}R_{j,j-1}\exp(-2i\delta_j)} \quad (1)$$

$$2\delta_j = \frac{4\pi}{\lambda} n_j d_j \cos\phi_j$$

wherein
    $R_{j+1,j}$: an amplitude reflection intensity between a j-th layer from the bottom and a layer immediately thereon,
    j: an integer of at least 1 (j−1=0 represents substance)
    i: an imaginary unit,
    $r_{j+1,j}$: a Fresnel reflection coefficient between a j-th layer from the bottom and a layer immediately thereon,
    $R_{j,j-1}$: an amplitude reflection intensity between a (j−1)-th layer from the bottom and a layer immediately thereon,
    $2\delta_j$: a phase difference at a j-th layer from the bottom,
    λ: an intended wavelength of reflected light,
    $n_j$: a refractive index of the j-th layer from the bottom,
    $d_j$: a thickness of the j-th layer from the bottom, and
    $\phi_j$: an incident angle of light on the j-th layer from the bottom, and
    as an equation for compensating a shape of the base particles, based on a visible light reflection waveform obtained by applying a $R_{flat}$ value obtained by substituting the recurring formula (1) to the following equation (2)

$$R(\lambda) = \int_0^{\frac{\pi}{2}} \sin 2\theta \cdot R_{flat}(\lambda, \theta) \cdot d\theta \quad (2)$$

wherein
    θ: an incident angle on an outermost layer.

2. The process for designing optically coherent multilayered film-coated powder according to claim 1, characterized in that substances and thicknesses of the coated layers and an order of formation of the layers are identified that provide an optically coherent multilayered film-coated powder having values $L^*_1$, $a^*_1$ and $b^*_1$ that make the color difference ($\Delta Z^*$) expressed by the equation (3) within a range of 100 or less.

3. The process for designing optically coherent multilayered film-coated powder according to claim 2, characterized in that substances and thicknesses of the coated layers and an order of formation of the layers are identified that provide an optically coherent multilayered film-coated powder having values $L^*_1$, $a^*_1$ and $b^*_1$ that make the color difference ($\Delta Z^*$) expressed by the equation (3) within a range of 50 or less.

4. The process for designing optically coherent multilayered film-coated powder according to claim 1, characterized in that the process is carried out by simulation using a computer.

5. A process for producing optically coherent multilayered film-coated powder, which comprises base particles having thereon at least two coated layers having refractive indexes different from each other, and reflects light with a particular wavelength, the process being characterized by:

selecting a substance of the base particles providing an intended function, and an intended color;

measuring a spectral intensity curve and values $L^*_0$, $a^*_0$ and $b^*_0$ in CIELAB color system of the intended color;

identifying substances and thicknesses of the coated layers and an order of formation of the layers that provide an optically coherent multilayered film-coated powder having values $L^*_1$, $a^*_1$ and $b^*_1$ that minimize a color difference ($\Delta Z^*$) expressed by the following equation (3):

$$\Delta Z = |(L^*_0 - L^*_1)^2 + (a^*_0 - a^*_1)^2 + (b^*_0 - b^*_1)^2|^{1/2} \quad (3)$$

and make a hue ratio expressed by the following equation (4):

$$(a^*_0/b^*_0)/(a^*_1/b^*_1) \quad (4)$$

within a range of from 0.9 to 1.1, based on the following recurring formula (1) in case where the base particles have a flat plate form:

$$R_{j+1,j} = \frac{r_{j+1,j} + R_{j,j-1}\exp(-2i\delta_j)}{1 + r_{j+1,j}R_{j,j-1}\exp(-2i\delta_j)} \quad (1)$$

$$2\delta_j = \frac{4\pi}{\lambda} n_j d_j \cos\phi_j$$

wherein $R_{j+1,j}$: an amplitude reflection intensity between a j-th layer from the bottom and a layer immediately thereon, j: an integer of at least 1 (j−1=0 represents substance)

i: an imaginary unit, $r_{j+1,j}$: a Fresnel reflection coefficient between a j-th layer from the bottom and a layer immediately thereon, $R_{j,j-1}$: an amplitude reflection intensity between a (j−1)-th layer from the bottom and a layer immediately thereon, $2\delta_j$: a phase difference at a j-th layer from the bottom, $\lambda$: an intended wavelength of reflected light, $n_j$: a refractive index of the j-th layer from the bottom, $d_j$: a thickness of the j-th layer from the bottom, and $\phi_j$: an incident angle of light on the j-th layer from the bottom, and as an equation for compensating a shape of the base particles, based on a visible light reflection waveform obtained by applying a $R_{flat}$ value obtained by substituting the recurring formula (1) to the following equation (2):

$$R(\lambda) = \int_0^{\frac{\pi}{2}} \sin 2\theta \cdot R_{flat}(\lambda, \theta) \cdot d\theta \quad (2)$$

wherein $\theta$: an incident angle on an outermost layer; and providing the coated layers on the base particles thus selected, according to the substances and the thicknesses of the coated layers and the order of formation of the layers thus identified.

6. The process for producing optically coherent multilayered film-coated powder according to claim 5, characterized in that substances and thicknesses of the coated layers and an order of formation of the layers are identified that provide an optically coherent multilayered film-coated powder having values $L^*_s$, $a^*_s$ and $b^*_s$ that make the color difference ($\Delta Z^*$) expressed by the equation (3) within a range of 100 or less.

7. The process for producing optically coherent multilayered film-coated powder according to claim 6, characterized in that substances and thicknesses of the coated layers and an order of formation of the layers are identified that provide an optically coherent multilayered film-coated powder having values $L^*_s$, $a^*_s$ and $b^*_s$ that make the color difference ($\Delta Z^*$) expressed by the equation (3) within a range of 50 or less.

8. The process for producing optically coherent multilayered film-coated powder according to claim 5, characterized in that substances and thicknesses of the coated layers and an order of formation of the layers are identified by simulation using a computer.

* * * * *